United States Patent [19]

Gordon

[11] Patent Number: 5,726,816
[45] Date of Patent: Mar. 10, 1998

[54] REVERSIBLE REARVIEW MIRROR

[75] Inventor: Paulo Alexandre Gordon, Sao Paulo, Brazil

[73] Assignee: Metagal Industria E Comercio Ltda.

[21] Appl. No.: 668,925

[22] Filed: Jun. 24, 1996

[30] Foreign Application Priority Data

Oct. 27, 1995 [BR] Brazil ..................... 9504888

[51] Int. Cl.$^6$ ................... G02B 7/18; B60R 1/06
[52] U.S. Cl. ............ 359/872; 359/841; 248/479; 248/481
[58] Field of Search ............... 359/841, 871, 359/872; 248/476, 479, 481, 488

[56] References Cited

U.S. PATENT DOCUMENTS

| | | | |
|---|---|---|---|
| 4,394,066 | 7/1983 | Sharp | 359/872 |
| 4,991,814 | 2/1991 | Schmidt et al. | 248/479 |
| 5,268,797 | 12/1993 | Santo | 359/872 |
| 5,337,188 | 8/1994 | Do Espirito Santo | 359/841 |

FOREIGN PATENT DOCUMENTS

| | | | |
|---|---|---|---|
| 3008031 | 9/1981 | Germany | 359/872 |
| 2130990 | 11/1984 | United Kingdom | 359/872 |

Primary Examiner—Ricky D. Shafer
Attorney, Agent, or Firm—Michael J. Striker

[57] ABSTRACT

The reversible rearview mirror has a mirror plate (1); a housing (2) which houses the mirror plate, both the mirror (1) and the housing (2) being symmetrical with respect to a horizontal axis (X); a supporting member (3) which is semirigid so as to be bendable when its ends are pressed toward each other in an axial direction; and a base (6) fixed to a vehicle body and on which the supporting member (3) is pivotally mounted and an attachment device for assembling and attaching the housing (2) to the supporting member (3) which is provided between the housing (2) and the supporting member (3). The attachment device includes two L-shaped clamps (4) which extend perpendicularly from respective outside regions of a lateral portion (10) of the supporting member (3) which receives the housing (2); and respective grooves (5) provided in a lateral portion (11) of the housing (2), adjacent to the lateral portion (10) of the supporting member (3), which receive the respective L-shaped clamps (4).

2 Claims, 2 Drawing Sheets

REVERSIBLE REARVIEW MIRROR

BACKGROUND OF THE INVENTION

The present invention relates to reversible rearview mirrors and, more particularly, to reversible external or outside rearview mirrors for automobiles.

Outside or external rearview mirrors of the reversible type are already known in the art. A reversible external rearview mirror of this type may be used, according to choice, on either the left or on the right side of the vehicle and essentially comprises a mirror plate; a housing which contains the mirror plate, both the mirror plate and the housing being symmetrical to a horizontal axis; a rigid member to which the housing is attached by bolts and clamps; and a base attached to the vehicle body and having a pivot joint in which the rigid member is mounted.

The rigid member is normally made of a thermoplastic material. There is at least one clamp between the member and the housing which locks the housing-mirror assembly in a given rotational position. One or more bolts are provided which assure the fastening together of the assembly.

Even considering the wide use and high efficiency of the outside rearview mirrors which use the above-mentioned construction, there are some inconveniences which may be attributed to them, such as the high complexity of the fastening means used between the housing and the rigid member, which creates difficulties at the assembly line, a fact which is undesirable.

Another problem is related to a certain degree of difficulty for the user when performing a reversal of the reversible external rearview mirror, which is also an undesirable fact.

SUMMARY OF THE INVENTION

It is an object of the present invention to provide an improved reversible rearview mirror which avoids the above-described disadvantages of the reversible rearview mirrors of the prior art.

It is another object of the present invention to provide a reversible rearview mirror of the automotive vehicle accessories field which is simpler to construct and use than similar ones of the prior art.

According to the invention, the reversible rearview mirror comprises a mirror plate; a housing which houses the mirror plate, both the mirror plate and the housing being symmetrical with respect to a horizontal axis; a semirigid supporting member having ends and being bendable when the ends are pressed toward each other in an axial direction; and a base on which the supporting member is pivotally mounted and which is fixed to a vehicle body; and attachment means for assembling and attaching the supporting member to the housing. The attachment means is arranged between the housing and the supporting member and comprises at least two L-shaped clamps and respective grooves provided in a lateral portion of the housing. The at least two L-shaped clamps have free ends and extend perpendicularly from respective outside regions of a lateral portion of the supporting member shaped to receive the housing, the at least two L-shaped clamps are arranged in longitudinal alignment on the lateral portion and with the free ends thereof facing in opposite directions with respect to each other and in substantially parallel directions to the respective closest rod ends of the supporting member. The respective grooves provided in the lateral portion of the housing adjacent to the lateral portion of the supporting member are arranged in a longitudinal alignment on the lateral portion of the housing so as to receive the at least two L-shaped clamps. Each of the at least two L-shaped clamps has a longer leg extending from the lateral portion of the supporting member and a shorter leg connected to the longer leg and the at least two L-shaped clamps engage themselves on opposite ends of the respective grooves closest to the lateral ends of the housing so that the longer legs of the at least two L-shaped clamps pass through the respective grooves and press against transverse edges of the grooves and the shorter legs of the L-shaped clamps press against internal surface regions of the housing adjacent to the aforementioned ends of the grooves, so as to press the lateral portion of the housing against the lateral portion of the supporting member.

BRIEF DESCRIPTION OF THE DRAWING

Considering the above-mentioned objects of the invention and disadvantages of the prior art reversible mirrors, the reversible rearview mirrors of the invention were developed to eliminate those disadvantages, the construction, operation and advantages of which will become clearer from the following detailed description and the attached drawings wherein.

DESCRIPTION OF THE PREFERRED EMBODIMENT

Figure 1:
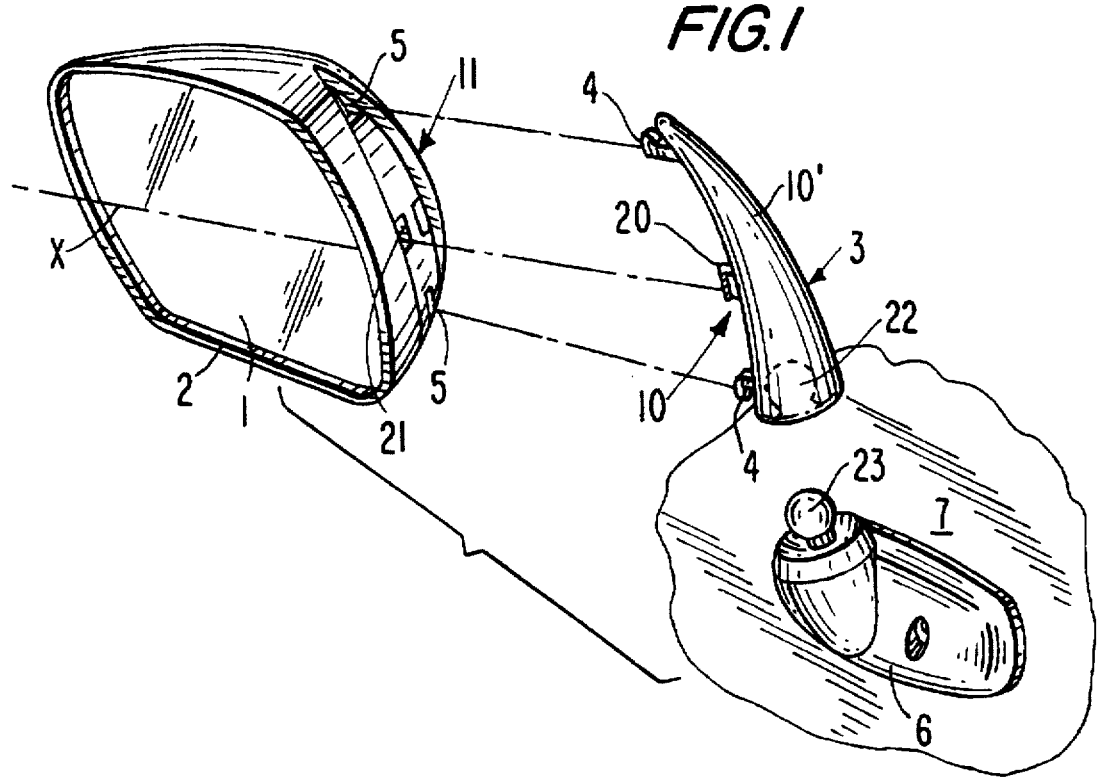
FIG. 1 is an exploded perspective view of a reversible rearview mirror according to the invention showing its parts separated from each other.

The reversible outside rearview mirror shown in the drawing substantially comprises a mirror plate 1; a housing 2 which houses the mirror plate, both the mirror plate 1 and the housing 2 being symmetrical with respect to a horizontal geometric axis X; a housing supporting member 3; attachment means 4,5 for assembling and attaching the housing and the supporting member arranged between the housing 2 and the supporting member 3; and a base 6 on which the supporting member 3 is pivotally mounted, and which is attached to the vehicle body 7. The housing 2, the supporting member 3 and the base 6 are made of an appropriate thermoplastic material.

Figure 3A:
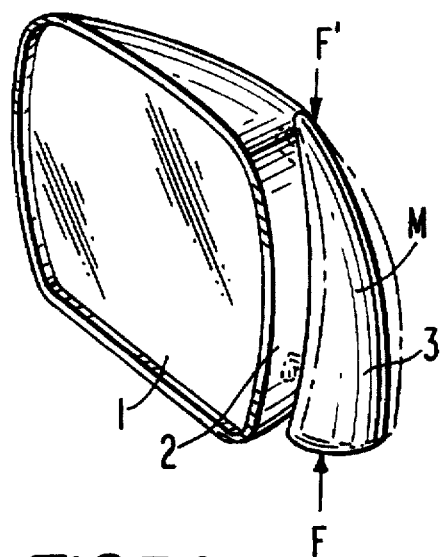
FIG. 3a is a perspective view of the assembled housing and member from the rearview mirror shown in FIG. 1.
Figure 3B:
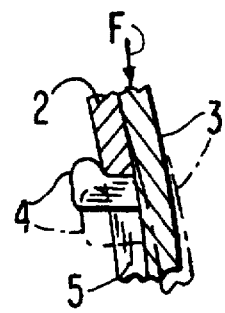
FIGS. 3b and 3c are detailed cutaway cross-sectional action views showing how the assembly or disassembly of the housing and member occurs.
Figure 3C:
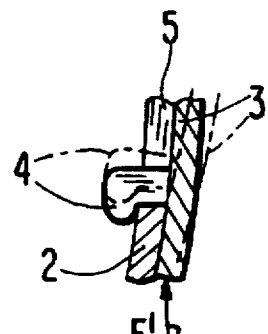

In the embodiment of the invention shown in the drawing, the supporting member 3 is semirigid so that it bends when its ends are pressed one toward the other in a direction substantially axial to the member. The attachment means 4,5 between the housing 2 and the supporting member 3 comprises at least two L-shaped profile clamps 4 which protrude perpendicularly from respective outside regions of a lateral portion 10 of the supporting member 3 which receives the housing 2. These clamps 4 are arranged in longitudinal alignment on the lateral portion 10 with their free ends pointing in opposite directions with respect to each other and in substantially parallel directions to the closest corresponding end of the supporting member 3. The attachment means 4,5 further comprises the respective grooves 5 provided in a lateral portion 11 of the housing 2, which is located adjacent to the lateral portion 10 of the supporting member 3. These grooves 5 are arranged in a longitudinal alignment on the lateral portion 11 of the housing and receive the L-shaped clamps 4, which connect themselves in their opposite ends, closest to respective opposite ends of the lateral portion 11, in such a way that the longer legs 12 of the L-shaped clamps 4, which extend from the lateral portion 10 of the supporting member 3, pass through the respective grooves 5 and remain pressed against the transverse edges of those grooves, and the shorter legs 13 of the L-shaped clamps 4 press against the internal surface regions of the housing 2, adjacent to the ends of the same grooves 5, pressing the lateral portion 11 of the housing 2 against the lateral portion 10 of the supporting member 3, therefore making the whole assembly comprising the housing 2 and supporting member 3 shown in FIG. 3 stable.

Figure 2A:
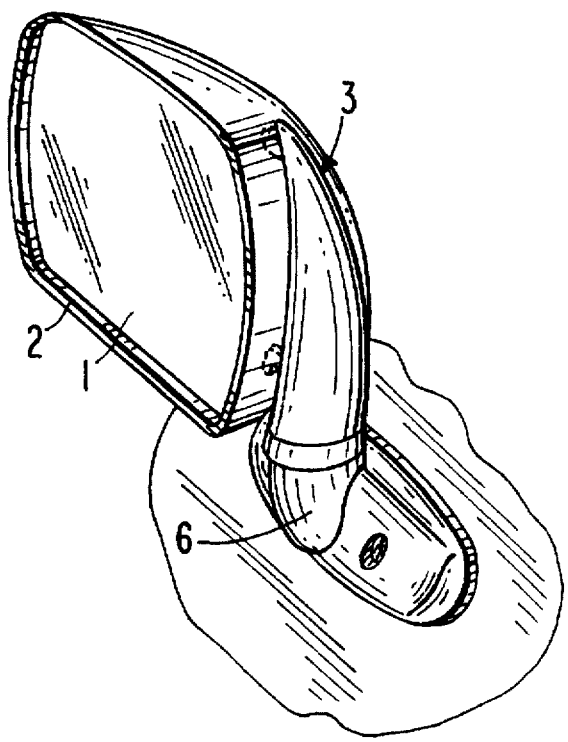
FIG. 2a is a perspective view of the rearview mirror of FIG. 1 shown in an assembled state for use on the left side of a vehicle.
Figure 2B:
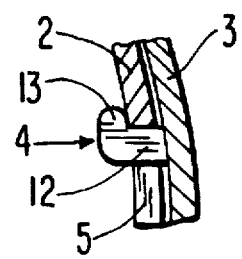
FIGS. 2b and 2c are detailed cutaway cross-sectional views of the mirror shown in FIG. 2a taken along a plane passing between the housing and the housing supporting member.
Figure 2C:
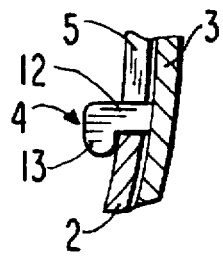

In this way, when the rearview mirror is assembled (FIG. 2), the L-shaped clamps 4 of the supporting member 3 remain connected in the respective grooves 5 of the housing 2, so that the edges of the longer legs 12 of those clamps remain pressed against the outside transverse edges of the grooves 5 and the edges of the shorter legs 13 of those clamps 4 remain pressed against the internal surfaces of the housing 2, pressing the lateral portion 10 of the supporting member 3 and the lateral portion 11 of the housing 2 one against the other, therefore making the whole assembly stable.

Figure 4:
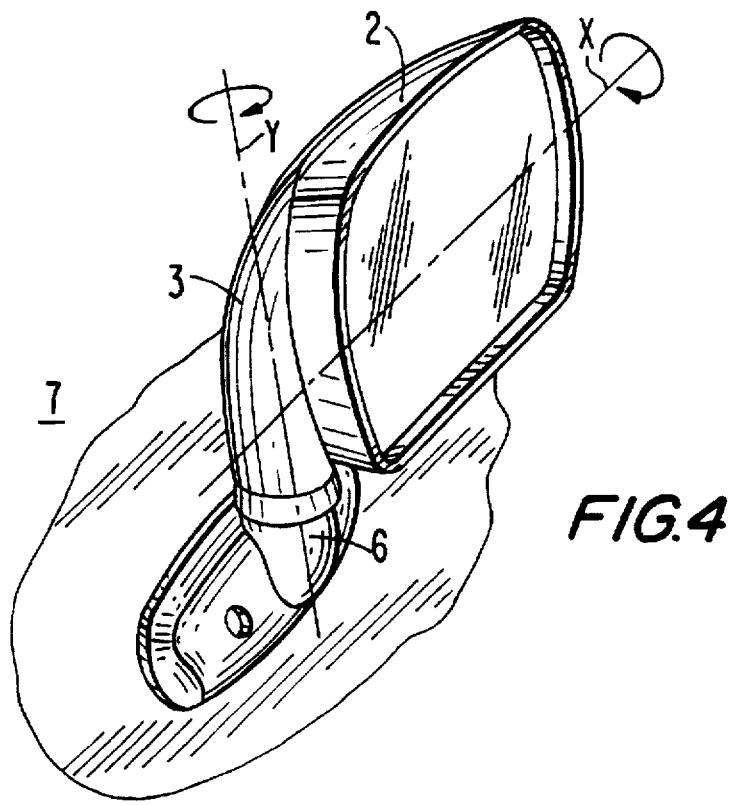
FIG. 4 is a perspective view of the reversible rearview mirror of FIG. 1 assembled for use on the right side of a vehicle.

When the mirror should be disassembled to have its configuration or position changed, as an example, from the right side (FIG. 2) to the left side (FIG. 4), the ends of the resilient supporting member 3 are pressed one toward one another (FIG. 3) by applying the opposite forces F and F' to bend the supporting member 3 in its middle region M, and the L-shaped clamps 4 to take a new position (shown in dot-dashed lines in FIGS. 3b , 3c) in which they may be disconnected from the respective grooves 5, therefore allowing the supporting member 3 to be disassembled from the housing 2.

Then, the housing 2 and mirror 1 assembly is turned about the horizontal axis X and the vertical axis Y (shown in FIG. 4) by 180° , and the supporting member 3 is again pressed to connect the L-shaped clamps 4 to the inverted grooves 5, i.e., an L-shaped clamp 4 enters into a groove 5 which had been previously connected to another different L-shaped clamp 4, and the supporting member 3 is released, so that the L-shaped clamps 4 again press against the outside transverse edges of the grooves 5 and the inner surfaces of the housing, due to the elasticity of the material used for making the supporting member 3, therefore fixing the assembly in its new configuration or position.

In the preferred embodiment, as shown in the figures, the supporting member 3 has a curved shape, in order to facilitate its bending, when its ends are pressed. Therefore, the supporting member 3 is semirigid and comprises a plate with a substantially elliptical cross-section, with concave surface 10 turned towards the housing 2. The concave surface 10 has at its ends the L-shaped clamps 4 and, at an intermediate level or middle position, the surface has two other auxiliary L-shaped clamps 20, located in a crossed or transverse alignment with respect to the longitudinal alignment of the clamps 4. These auxiliary L-shaped clamps 20 are connected in the respective grooves 21 (FIG. 1) provided in the lateral portion 11 of the housing 2 and the lower end of the supporting member is provided with a seat 22, which connects with a ball 23 provided on the base 6. Together the ball 23 and the seat 22 comprise a ball joint for pivotal adjustment of the position of the mirror plate.

The housing 2 has a slightly recessed lateral portion 11 in which the grooves 5 and 21 are provided, with their a shape or profile corresponding substantially to that of the supporting member 3 so as to be ready to receive the supporting member so that the convex outside surface 10' of the above-mentioned supporting member 3 is continuously joined with the outside surface of the housing 2.

Within the above-described basic conception of the invention, the reversible outside rearview mirror may be changed with respect to materials, configurations, dimensions, colors, finishing and others, without avoiding the protection provided by the appended claims.

While the invention has been illustrated and described as embodied in a reversible rearview mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A reversible rearview mirror, comprising a mirror plate (1); a housing (2) housing the mirror plate (1) and having a lateral portion (11), both the mirror plate (1) and the housing (2) being symmetrical with respect to a horizontal axis (X); a resilient housing supporting member (3) having supporting member ends and a lateral portion (10) and being bendable when said supporting member ends are pressed toward each other in an axial direction, the lateral portion (10) of the supporting member being shaped to engage with the lateral portion (11) of the housing (2) when the supporting member (3) is assembled with the housing (2); a base (6) on which said supporting member (3) is pivotally mounted and which is fixed to a vehicle body; and attachment means (4,5) for assembling and attaching the supporting member (3) to the housing (2), wherein said attachment means (4,5) is arranged between the housing (2) and the supporting member (3) and comprises at least two L-shaped clamps (4) and respective grooves (5) provided in the lateral portion (11) of the housing (2) in which said at least two L-shaped clamps (4) engage, each of said at least two L-shaped clamps (4) have free ends and extend perpendicularly from the lateral portion (10) of the supporting member (3), said at least two L-shaped clamps (4) are arranged in longitudinal alignment on said lateral portion (10) and with the free ends thereof facing in opposite directions with respect to each other and in substantially parallel directions and toward the respective closest supporting member ends of the supporting member (3); and the respective grooves (5) are provided in the lateral portion (11) of the housing (2) in a longitudinal alignment and positioned so as to receive said at least two L-shaped clamps (4), and each of said at least two L-shaped clamps has a longer leg (12) extending from the lateral portion (10) of the supporting member (3) and a shorter leg (13) connected to the longer leg (12), and said at least two L-shaped clamps (4) engage themselves on opposite ends of said grooves (5) closest to respective opposite ends of the lateral portion (11) of the housing (2) so that the longer legs (12) of said at least two L-shaped clamps (4) pass through the respective grooves (5) and press against transverse edges of said grooves and the shorter legs (13) of said L-shaped clamps (4) press against internal surface regions of the housing (2) adjacent to said ends of said grooves (5) so as to press the lateral portion (11) of the housing (2) against the lateral portion (10) of the supporting member (3).

2. The reversible rearview mirror as defined in claim 1, wherein the supporting member (3) has a curved shape to facilitate bending of said supporting member when said supporting member ends of said supporting member are pressed and said supporting member (3) comprises a body with a substantially elliptical cross-section and said lateral portion (10) of the supporting member (3) has a concave surface facing said housing (2) and said housing (2) has a corresponding surface fitting said concave surface of said lateral portion (10) and said at least two L-shaped clamps (4) are located at opposite ends of said concave surface; and further comprising two other auxiliary L-shaped clamps (20) located in an intermediate position on said concave surface of the lateral portion (10) of the supporting member (3) and arranged in a transverse alignment with respect to the longitudinal alignment of said at least two L-shaped clamps (4) and respective grooves (21) provided in the lateral portion (11) of the housing (2) in which said two other auxiliary L-shaped clamps (20) engage; and wherein said supporting member (3) is provided with a seat (22) in a lower supporting member end of said supporting member and said base (6) is provided with a ball (23) fitting in said seat (22) to form a ball joint for pivotal mounting of the supporting member (3) on the base (6), and the lateral portion (11) of the housing (2) is slightly recessed from an outside surface of the housing and has a shape substantially corresponding to that of the supporting member (3) so as to be ready to receive said member so that a convex outside surface (10') of the supporting member (3) is continuously connected with the outside surface of the housing (2).

* * * * *